March 1, 1927.
B. GRAEMIGER
FLUID FLOW METER
Filed May 8, 1925
1,619,416
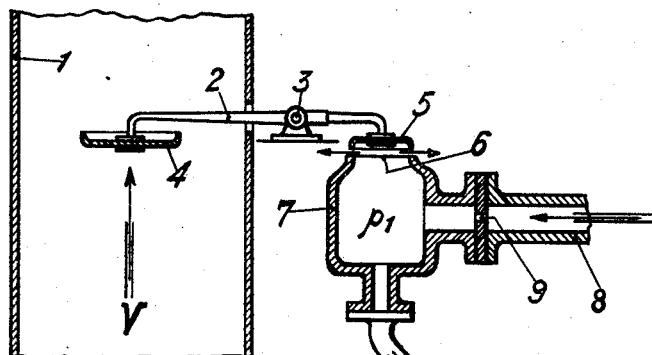
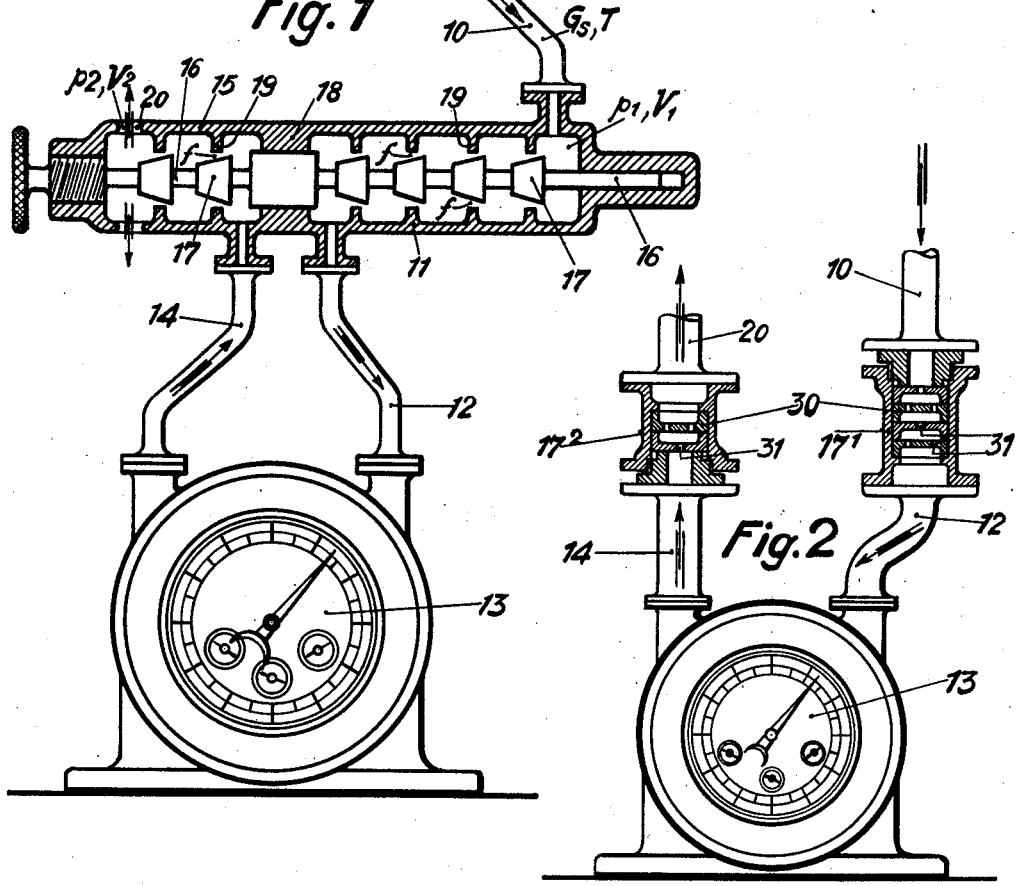
Inventor,
Benjamin Graemiger,
By
Atty.

Patented Mar. 1, 1927.

1,619,416

UNITED STATES PATENT OFFICE.

BENJAMIN GRAEMIGER, OF ZURICH, SWITZERLAND.

FLUID-FLOW METER.

Application filed May 8, 1925, Serial No. 28,908, and in Switzerland May 16, 1924.

The present invention relates to improvements in fluid flow meters. In order to measure the quantity of gas flowing through pipes various devices are employed, such as for example as Venturi meters, raised dam flanges, Pitot tubes and baffles. In the case of all these devices a rise or fall of pressure is produced which is substantially proportional to the square of the flow quantity to be measured. Now it offers no special difficulties to sub-divide the dial plate or the recording paper of a pressure gauge or of a pressure-recorder according to this law, so that the volume flowing through can be read off directly on a pressure gauge or pressure-recorder.

If however the quantity flowing through during a certain period is to be totalled (integrated or reckoned up) the above-mentioned relationship gives rise to difficulties, for one cannot integrate in the usual way, for example on the recording paper of the recording apparatus. The problem is still harder and more complicated if the integration is to be effected automatically.

Arrangements are already known in which a throttling opening placed in a pipe for the fluid to be measured produces a difference of pressure. This is transferred to a tilting apparatus which serves to act on the volume of an auxiliary liquid flowing out of a tube, it being possible to make the volume of the auxiliary liquid flowing out directly proportional to the volume of the fluid to be measured and to measure the same with the aid of known counting devices. The object of the present invention is however to provide an apparatus which permits of the volume flowing through a pipe or the like to be automatically integrated over times of any desired length without use being made of auxiliary liquids.

In the apparatus according to the invention there is a pressure chamber in which a resistance body moved by the flowing medium produces a rise of pressure proportional to the square of the volume flowing through a pipe or the like, the said pressure chamber being connected, through a throttling device, to a meter for measuring volumes of gas.

Constructional examples of the subject matter of the present invention are illustrated on the accompanying drawings, in which—

Fig. 1 shows in diagrammatic manner and with parts shown in section a first constructional example of a fluid flow meter, and Fig. 2 shows a second constructional example.

The constructional example illustrated in Fig. 1 serves for measuring the quantity of gas flowing through the suction pipe 1 of a centrifugal compressor during a certain interval of time. This apparatus comprises a two-armed lever 2 rotatable about a pivot 3, an impact plate 4 being fastened to the said lever. At the other end this lever 2 carries a valve disc 5, which can close the outlet aperture 6 of a pressure chamber 7. Into this pressure chamber 7, there flows, through a pipe 8 and a throttle opening 9, compressed air which may be taken for example from the centrifugal compressor at a suitable point. This arrangement, which in itself is known, makes it possible to produce in the pressure chamber 7 a rise of pressure $\Delta p$ which is proportional to the square of the velocity of flow and hence also to the square of the volumn of flow in the pipe 1. Hence $\Delta p$ is proportional to $V^2$.

Now the compressed air can pass out of the chamber 7 by a pipe 10 and through a throttling device 11 and a pipe 12 to a gas meter 13, of known construction. This quantity of air flows out of the gas meter 13 through a pipe 14 and through a second throttling device 15 into the atmosphere. The throttling devices 11 and 15 are constituted by a rod 16 with conical thickenings 17, which is displaceable in a cylinder 18. The latter is divided by pierced partitions 19 into various chambers.

Now let $G_s$ designate the weight of air per second flowing through the throttling devices and the gas meter.

$f$ the cross-sectional area of each constriction of the throttling device in square meters;

$z$ the aggregate number of constrictions in the two throttling devices 11 and 15;

R Regnault's coefficient;

T the absolute temperature;
$g$ the acceleration due to gravity;
$p_1$ the absolute pressure in the pressure chamber 7; and $p_2$ the external pressure, that is, the pressure at the place of discharge from the second throttling device 15. Then:

$$G_s = f\sqrt{\frac{g}{zRT}}\sqrt{p_1^2 - p_2^2}$$

(Compare Stodola: "Steam Turbines", 4th German edition, page 319, equation 5.)

Let the volume flowing through at the inlet to the first throttling device 11 be $V_1$ and at the outlet from the second throttling device 15 let it be $V_2$, and let the volume flowing through the gas meter 13 be $V_3$, and the pressure in the gas meter $p_3$. Furthermore $p_1 - p_2 = \Delta p$. Let the throttling device 11 be so dimensioned that the fall of pressure therein is approximately at least three-quarters of the available fall of pressure $\Delta p$ between the auxiliary pressure chamber 7 and the outlet 20 from the second throttling device 15. Then $$p_3 = p_2 + \frac{\Delta p}{4}.$$

On the basis of this assumption we obtain:—

$$V_3 = \left(f\sqrt{\frac{g}{zRT}}\right) \cdot \left(\frac{RT}{p_3}\right) \cdot \sqrt{p_1^2 - p_2^2};$$

and since $$p_1^2 - p_2^2 = (p_1 + p_2) \cdot (p_1 - p_2) = (2p_2 + \Delta p) \cdot \Delta p$$

it follows that:—

$$V_3 = \left(f\sqrt{\frac{gRT}{z}}\right) \cdot \left(\frac{\sqrt{2p_2 + \Delta p}}{p_2 + \frac{\Delta p}{4}}\right) \cdot \sqrt{\Delta p}.$$

Now if the first expression in brackets on the right-hand side of this equation is designated by C and the second by A, we obtain:—

$$V_3 = C.A.\sqrt{\Delta p}.$$

The first factor C is a constant, for even the temperature T may be regarded as constant to a close approximation, because changes of temperature are as a rule small relatively to the absolute temperature, and moreover T occurs under the square-root sign. The second factor A may be re-expressed as follows: On the assumption that $\Delta p$ is small relatively to $p_2$, we obtain, by series expansion of the root $$A = \frac{\sqrt{1 + \frac{\Delta p}{p_2} \cdot \frac{1}{2}}}{1 + \frac{\Delta p}{p_2} \cdot \frac{1}{4}} = \frac{1 + \frac{\Delta p}{p_2} \cdot \frac{1}{4}}{1 + \frac{\Delta p}{p_2} \cdot \frac{1}{4}} = 1,$$

that is to say, A also becomes a constant on the assumption indicated, and this assumption can be fulfilled to a substantial extent. Finally we obtain:

$$V_3 = a\ \text{constant} \times \sqrt{\Delta p},$$

and consequently, since according to the above $\Delta p$ is proportional to $V^2$, $$V_3 = a\ \text{constant} \times V,$$

that is, in words, it is possible, by means of the device described, to measure at the gas meter 13 a volume which is proportional to the volume flowing through the pipe 1.

By way of further elucidation we will give a numerical example.

Let the volume-measuring device itself be so designed that the gauge pressure $\Delta p$ occurring in the pressure chamber 7 = the pressure head due to a column of water 1000 millimeters in height, and let the external pressure $p_2 = 10,000$ millimeters head of water. From this it follows immediately that the approximation employed in expanding the constant A is quite admissible.

Let it be for example a question of measuring a volume of V=500 cubic meters per minute in the pipe 1. The throttling devices 11 and 15 may then be at once so arranged that the volume $V_3$ flowing through the gas meter amounts to about 0.1 of a cubic meter per minute. This already implies for the gas meter quite a considerable volume, thus leading to a strong and comparatively accurate and sensitive measuring instrument. The quantity of air flowing through the gas meter amounts however to only 0.02 per cent. of the quantity V to be measured.

If the apparatus were so arranged that $\Delta p$ was still smaller, the measuring would still be possible without any serious error, if the throttling device were not divided into two parts, as described, and the air flowing through the gas meter 13 were to be taken off at the end of the throttling device 11 and were to exhaust from the gas meter directly into the atmosphere, which arrangement would be obtained by omitting the throttling device $17^2$ in Fig. 2.

If instead of compressed air a gas is available that must not be lost, both the quantity discharged from the opening 6 and the discharge from the gas meter 13 would have to be led back into the pipe 1.

Both the pressure $\Delta p$ in the chamber 7 and also the volume $V_3$ flowing through the gas meter 13 can be calculated with considerable accuracy in advance. An appliance can therefore be constructed in which at the outset the dial plate of the gas meter is graduated to show the volume flowing through the pipe 1. It then only remains to effect the fine adjustment on the basis of a calibration. According as the rod 16 is shifted towards the right or towards the left the throttling apertures $f$ become larger or smaller. The proportionality constant between the measuring pressure $\Delta p$ and the volume V can also be altered by alterations in the elements 1 to 7 of the apparatus.

The resistance which has to be overcome in the gas meter 13 cannot materially affect the exactitude of the measuring, and in particular a favourable effect is produced by the fact that this resistance increases with the square of the quantity of gas flowing through. Allowance can also be made for this resistance when calibrating the apparatus.

The device may also be employed to measure a quantity of liquid flowing through the pipe 1. In such a case air or a gas is still admitted through the pipe 8.

The throttling devices employed may be constructed in any desired manner and may for example comprise one or more nozzles or may be constructed as a labyrinth of any kind.

An arrangement showing throttling devices of the labyrinth type is illustrated in Fig. 2. The throttling device $17^1$, interposed between the pipes 10 and 12 comprises a number of baffle plates 30 arranged within a casing. The individual baffle plates are provided with small openings 31 through which the gas has to pass, preferably these openings do not register so that a tortuous path is presented to the gas. The gas leaving the gas meter 13 by the pipe 14 flows through the throttling device $17^2$, which is also provided with baffle plates 30 having openings 31, and with the outlet opening 20.

I claim:

1. An apparatus for the automatic integration of quantities of fluid flowing through a conduit during periods of any desired length, comprising in combination; a pressure chamber provided with an outlet opening, means to supply a fluid under pressure to said chamber, a valve device to control the outlet opening of said chamber, a movable resistance body to be placed within said conduit and spaced from the walls of the conduit to permit passage of the fluid past said member under all conditions of operation, means connecting said movable resistance member to the valve-device for moving the latter upon a movement of the resistance member to change the specific pressure in said chamber, a meter for measuring the volumes of fluid and provided with an inlet and an outlet, means for connecting the interior of said pressure chamber to the inlet of said meter to measure the unvented fluid passing from said chamber into the meter, and a throttling device interposed between said chamber and said meter.

2. An apparatus for the automatic integration of quantities of fluid flowing through a conduit during periods of any desired length, comprising in combination: a fluid pressure chamber having a vent, means to supply a gas under pressure to said chamber, a valve device to control the vent, a movable resistance body within said conduit and the fluid flowing therethrough and spaced from the walls of the conduit to permit passage of fluid past said member under all conditions of operation, means connecting said movable resistance body to said valve device for moving the latter upon a movement of the resistance body to vary the pressure in the pressure chamber proportionally to the square of the volume of fluid flowing through the conduit by controlling the venting of the gas passing through the pressure chamber, a gas meter provided with an inlet and an outlet, means connecting the interior of the pressure chamber to the inlet of said meter for measuring the unvented gas passing from said chamber into the meter, a throttling device interposed between said chamber and the meter, and a second throttling device connected at the one end to the outlet of said meter and at the other end to the atmosphere.

3. An apparatus for the automatic integration of quantities of fluid flowing through a conduit during periods of any desired length, comprising in combination: a fluid pressure chamber having a vent, means to supply a gas under pressure to said chamber, a valve device to control said vent, a movable resistance body within the conduit and the fluid passing therethrough and spaced from the walls of the conduit to permit passage of fluid past said member under all conditions of operation, means connecting the body and device for moving the latter upon a movement of the body to vary the pressure in the pressure chamber proportionally to the square of the volume of fluid flowing through the conduit by venting said chamber, a gas meter having an inlet and an outlet, means connecting the interior of said chamber and meter inlet for measuring unvented gas passing from said chamber through the meter, an adjustable throttling device interposed between said chamber and meter inlet, and a second adjustable throttling device having a discharge opening and connected to the meter outlet, said two throttling devices so dimensioned that approximately three quarters of the available fall of pressure between the chamber and discharge opening of the second throttling device is produced in the first throttling device.

4. An apparatus for the automatic integration of quantities of fluid flowing through a conduit during periods of any desired length, comprising in combination; a pressure chamber having a normally open vent, means to supply a gas under pressure thereto, a valve device to control the vent, a movable resistance body within said conduit and fluid flowing through the latter and spaced from the walls of the conduit to permit passage of fluid past said member under all conditions of operation, means connecting said movable resistance body to said valve device for moving the latter upon a movement of the resistance body to vary the pressure in the pressure chamber proportionally to the square of the volume of fluid flowing through the conduit by controlling the venting of the gas passing through the pressure chamber, a gas meter having an inlet and an outlet, means connecting the interior of the pressure chamber to the inlet of said meter for measuring the unvented gaseous fluid passing from said chamber into the meter, an adjustable throttling device connected to the outlet of the meter and communicating with the atmosphere, said throttling device comprising a casing having pierced partitions and a longitudinally displaceable rod with conical thickenings cooperating with said pierced partitions.

In testimony whereof, I have signed my name to this specification.

BENJAMIN GRAEMIGER.